(12) United States Patent
Bayramian et al.

(10) Patent No.: US 11,754,866 B2
(45) Date of Patent: Sep. 12, 2023

(54) GAS COOLED FARADAY ROTATOR AND METHOD

(71) Applicant: Lawrence Livermore National Security, LLC, Livermore, CA (US)

(72) Inventors: Andrew J. Bayramian, Manteca, CA (US); Alvin C. Erlandson, Livermore, CA (US); Daniel C. Mason, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 527 days.

(21) Appl. No.: 16/641,977

(22) PCT Filed: Aug. 27, 2018

(86) PCT No.: PCT/US2018/048185
§ 371 (c)(1),
(2) Date: Feb. 25, 2020

(87) PCT Pub. No.: WO2019/046212
PCT Pub. Date: Mar. 7, 2019

(65) Prior Publication Data
US 2020/0218100 A1 Jul. 9, 2020

Related U.S. Application Data

(60) Provisional application No. 62/551,205, filed on Aug. 28, 2017.

(51) Int. Cl.
*G02F 1/00* (2006.01)
*G02F 1/09* (2006.01)
*G02F 1/01* (2006.01)

(52) U.S. Cl.
CPC .............. *G02F 1/09* (2013.01); *G02F 1/0136* (2013.01); *G02F 2203/21* (2013.01)

(58) Field of Classification Search
CPC ...... G02F 1/09; G02F 1/0136; G02F 2203/21; G02B 27/28
See application file for complete search history.

(56) References Cited

U.S. PATENT DOCUMENTS

| 5,115,340 A | 5/1992 | Tidwell |
| 5,978,135 A * | 11/1999 | Abbott .................... G02F 1/093 359/324 |
| 7,068,413 B1 | 6/2006 | Fitzgerald et al. |

(Continued)

OTHER PUBLICATIONS

International Search Report and Written Opinion from PCT Application No. PCT/US2018/048185, dated Dec. 14, 2018.

*Primary Examiner* — Ellen E Kim
(74) *Attorney, Agent, or Firm* — Zilka-Kotab, P.C.

(57) ABSTRACT

To enable several orders of magnitude increases in average power and energy handling capability of Faraday rotators, the technology utilizes high speed gas cooling to efficiently remove thermal loading from the Faraday optic faces while minimizing the thermal wavefront and thermal birefringence by creating a longitudinal thermal gradient. A recirculating gas cooling manifold accelerates the gas over the surface of the slab to create a turbulent flow condition which maximizes the surface cooling rate. The technology further provides a spatially uniform thermal profile on the Faraday slabs.

20 Claims, 4 Drawing Sheets

(56) References Cited

U.S. PATENT DOCUMENTS

| | | | |
|---|---|---|---|
| 7,259,913 B2 | 8/2007 | Iida | |
| 8,314,612 B1* | 11/2012 | Rodgers | G01R 33/032 |
| | | | 359/484.01 |
| 11,329,448 B2 | 5/2022 | Mason et al. | |
| 2005/0111073 A1* | 5/2005 | Pan | G02F 1/093 |
| | | | 359/280 |
| 2009/0290213 A1 | 11/2009 | Yamazaki | |
| 2012/0105931 A1 | 5/2012 | Deri et al. | |
| 2014/0218795 A1* | 8/2014 | Scerbak | G02F 1/093 |
| | | | 359/484.04 |
| 2014/0253986 A1* | 9/2014 | Inoue | G02F 1/09 |
| | | | 359/9 |
| 2014/0346374 A1 | 11/2014 | Yanagida et al. | |
| 2015/0124318 A1* | 5/2015 | Scerbak | G02F 1/093 |
| | | | 359/484.04 |
| 2016/0154229 A1 | 6/2016 | Milner et al. | |

* cited by examiner

GAS COOLED FARADAY ROTATOR AND METHOD

CROSS-REFERENCE TO RELATED APPLICATIONS

This application claims the benefit of U.S. Provisional Patent Application No. 62/551,205 titled "Gas Cooled High Average Power Faraday Rotator," filed Aug. 28, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to Faraday rotators, and more specifically, relates to techniques which may dramatically improve the average power handling capability of Faraday rotators. The present technology involves a gas cooled high average power faraday rotator.

Description of Related Art

Faraday rotators are used in laser systems for polarization switching, isolation of laser amplifier components against back reflection, and depolarization correction. For high energy laser systems where apertures are large and wavefront is critical, these devices typically use crystals or glasses that have high Verdet constant, which sets the rotation for a given pathlength and fixed magnetic field. It is desirable to minimize optical pathlength both for wavefront reasons as well as b-integral and thermal effects. It is also desirable to use fixed magnets to create compact devices. This has generally converged the industry around Terbium doped optical media which display a relatively high Verdet constant and can be doped into a variety of materials including Terbium Gallium Garnet (TGG), Terbium doped glasses, and Potassium Terbium Fluoride (KTF). These materials have a small but nevertheless measurable absorption coefficient which results in thermal loading of these materials under average power. Thermal loading of an optical material results in changes in refractive index with temperature (dn/dT), thermal expansion, and stress birefringence which is a result of this expansion. The stress birefringence modifies the incoming polarization and scatters a small amount into other polarization states, which is otherwise known as depolarization. Since these devices are utilized for polarization switching and isolation, the purity with which the polarization is handled is critical.

Depolarization of the Faraday elements effectively spoils the capability and defeats the purpose of utilizing the Faraday elements in the first place. Various methods have been utilized in the past to compensate for thermal effects including using two slabs of the material with a rotator between to thermal birefringence compensate as well as actively cooling through water or cold plate one face of a rotator material (active mirror concept) to minimize birefringence and create a longitudinal thermal gradient. As apertures and average powers increase it becomes harder and harder to maintain birefringence compensation. Similarly, the active mirror concept is also limiting as either the thickness must decrease (and therefore magnetic field increase) or the number of devices increase to handle high power. The current state of the art is incapable of scaling to be within the range of 100 kW-1 MW.

SUMMARY

The present technology enables scaling of average power handling from current sub-kW demonstrations to 100 kW-1 MW capabilities. Applying the present technology to a Faraday rotator's optical components enables several orders of magnitude increase in average power and energy handling capability of these devices. Faraday rotators are used in laser systems for polarization switching, isolation of laser amplifier components against back reflection and depolarization correction. Currently these devices are limited in average power handling capability.

High speed gas cooling efficiently removes thermal loading from Faraday optic faces while minimizing the thermal wavefront and thermal birefringence by creating a longitudinal thermal gradient. A recirculating gas cooling manifold accelerates the gas over the surface of the slab to create a turbulent flow condition which maximizes the surface cooling rate. The present technology further provides a spatially uniform thermal profile on the Faraday slabs. One embodiment includes a uniformly heated slab that is insulated around the perimeter.

This device is useful in many applications, including in the high average power laser drivers for inertial fusion energy, drivers for laser accelerator systems, defense applications, laser peening, welding, cutting and additive manufacture.

BRIEF DESCRIPTION OF THE DRAWINGS

The accompanying drawing, which is incorporated into and forma a part of the disclosure, illustrate an embodiment of the invention and, together with the description, serves to explain the principles of the invention.

DETAILED DESCRIPTION OF THE TECHNOLOGY

The present technology may enable several orders of magnitude increase in average power and energy handling capability of Faraday rotator optical components. The optical aperture of a Faraday rotator for a particular laser system is set nominally by the laser damage threshold of the Faraday material. The thickness of the material is set by the magnet design required for uniformity and desired rotation at this aperture. With these two values known along with the absorption coefficient of the particular Faraday material chosen (see Table 1 of typical materials), one can calculate the absorbed power at the use location in the laser system.

TABLE 1

Material properties of prime candidate Faraday materials

| Material | Max diameter size to date (mm) | Verdet Constant at 1064 nm (min/Oe-cm) | Absorption coefficient (cm$^{-1}$) | Nonlinear refractive index (×10$^{-20}$ m$^2$/W) | Damage threshold (J/cm$^2$) |
|---|---|---|---|---|---|
| Tb: glass | 300 | 0.11 | 0.003 | 6.09 | 7.0 at 12 ns |
| TGG | 50 | 0.17 | 0.003 | 20.0 | 10.0 at 10 ns |
| KTF | 45 | 0.15 | 0.0003 | 1.92 | 2.0 at 10 ns |

High speed helium gas cooling efficiently removes several W/cm$^2$ thermal loading from amplifier faces while minimizing the thermal wavefront and thermal birefringence by creating a longitudinal thermal gradient. A recirculating helium cooling manifold accelerates the gas over the surface of the slab to create a turbulent flow condition which maximizes the surface cooling rate. An example of such a system sufficient for a 100 kW class rotator would be a system pressurized with helium to 45 psi and flowing at a rate of ~Mach 0.1 (turbulent flow conditions) over the surface of the Faraday material slab surface. This technology allows the heat removal to be accomplished in transmission, so the problem can be attacked by changing aperture size and/or by splitting the material into thinner and thinner slabs to achieve desired results. For the Faraday material case, the thermal loading is much lower than the amplifiers in the same system and comparable to current low power thermal loads on existing amplifiers. Consider a 100 kW laser system that must double pass a Faraday rotator made of TGG with an aperture of 5×5 cm$^2$ and a thickness of 3 cm. The total thermal power absorbed in the crystal is 1800 W. If this crystal is split into 6 slabs where each slab is 5 mm thick, then the thermal loading that must be removed from each surface is 6 W/cm$^2$ on each surface, which is well within the capability of high speed gas cooling. As with the amplifier systems, helium is the preferred gas due to it low refractive index and low dn/dT, minimizing turbulence and scattering effects on the transmitted beam.

Figure 1:
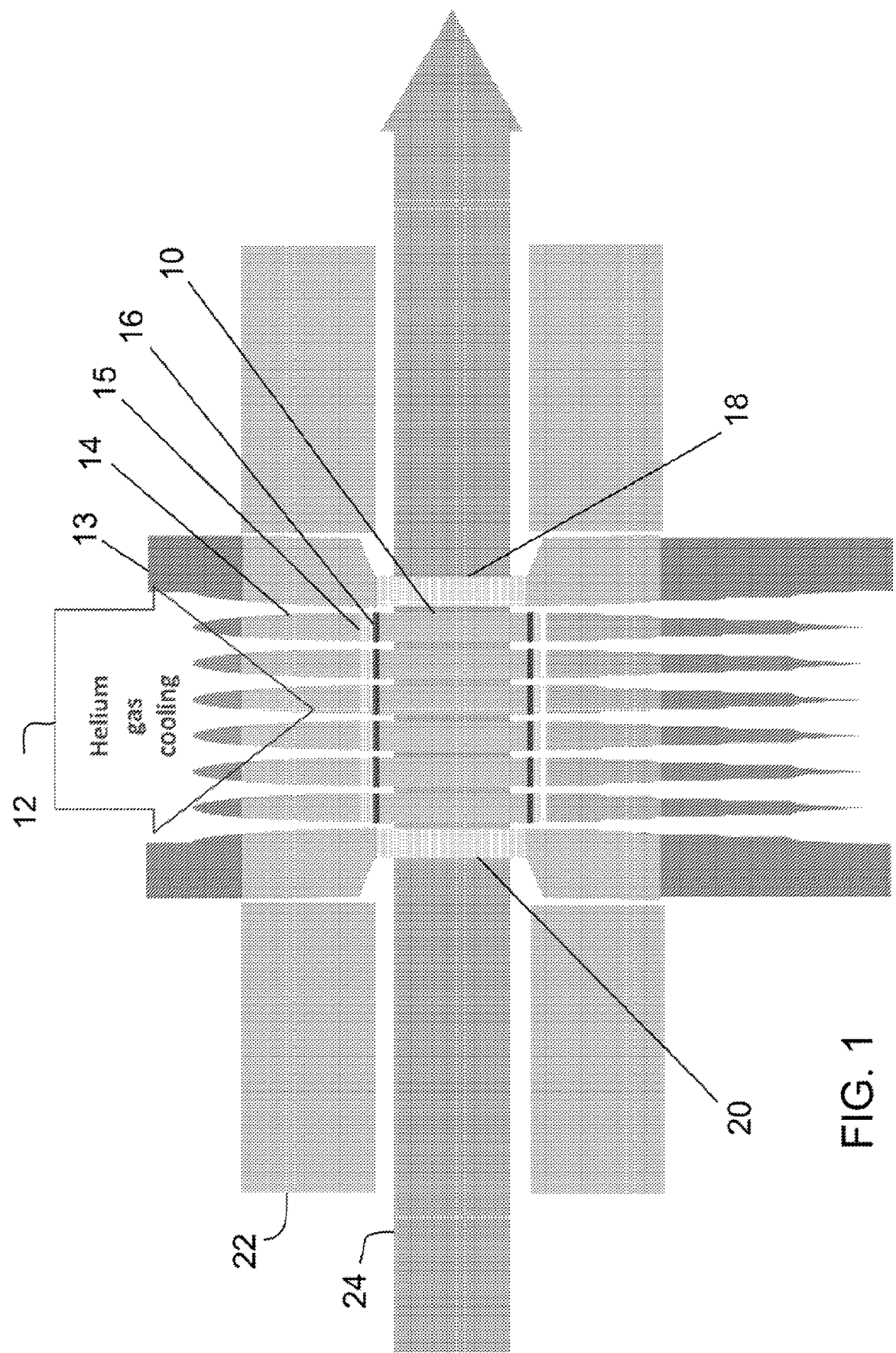
FIG. 1 illustrates an embodiment of the present high average power Faraday rotator FIG. 2 diagrams a method in which heater beams are projected onto the periphery of a Faraday optic slab.

Understanding and accommodating the thermal load is the first step in the design of this system. The second step is creating the most spatially uniform thermal profile on the Faraday slabs. To accomplish this, it is desirable to have a uniformly heated slab that is insulated around the perimeter (so no cooling can occur in that direction) and with the required heat transfer from the front and back slab faces (via the high-speed gas cooling). The techniques used in the present invention are not possible on an amplifier due to the much lower magnitude thermal load and the lack of requirement for edge cladding of a Faraday rotator material. Since it is not possible to completely fill the optical aperture with the beam (since this would incur huge diffractive loss and beam quality degradation on the transmitted beam), the present invention uses edge heaters to accomplish the thermal balance. There are several options which are functionally equivalent but offer pros and cons mechanically. One option is to attach heaters (e.g., thin film sheet heaters) to the edges of the slab. These also could be shaped to create a spatially dependent heat load across the edge of the slab to improve uniformity. This enables each unit to be independent and separately tunable for flat thermal profile. The optical mode-fill, slab thickness and heater power are all variables that can be tuned to achieve uniformity. This concept is depicted in FIG. 1, which is a cross-sectional side view showing the Faraday material 10 in a series of slabs, Helium gas cooling 12, gas cooling vanes including portions 13 and 14, insulating material (e.g., insulating potting compound) 15, heaters 16, pressure vessel windows 18 and 20 and magnetic array housing 22 needed to achieve a high average power Faraday rotator. The figure shows laser beam 24 passing through the Faraday material 10. The outer periphery of the slabs can be round or square or any shape desired. It is desirable to make each slab to be uniformly heated such that there is no cool boundary around the beam. The heater for each slab may be in contact with the slab all the way around the slab. The side of the heater that is opposite to the slab is in contact with the insulating material and the insulating material is in contact with the magnetic housing. The gas flows between each slab. The magnetic array housing includes openings between the cooling vanes to allow gas to flow between each Faraday slab. Also, the gas cooling vanes can be formed of magnetic material. In this embodiment, a portion 13 of the cooling vane is formed of aluminum and a portion 14 is formed of magnetic material. The refractive index of helium, and thus dn/dT, are extremely low (~10× lower than any other material besides vacuum), making any disturbance of the laser beam wavefront by the gas flow minimized. It is turbulent flow, so the wavefront distortion is analogous to white noise and has been demonstrated as a cooling method to provide wavefront errors which are below measurement capability. Generally, a plurality of slabs is used because it is desirable to provide as close to a longitudinal thermal gradient as possible. Large temperature rises are undesirable (the thicker the material the temperature goes up as t$^2$ set by thermal conductivity of the material. However, for lower power systems one slab could work. One embodiment uses only two slabs of the material with a rotator between.

Figure 2:
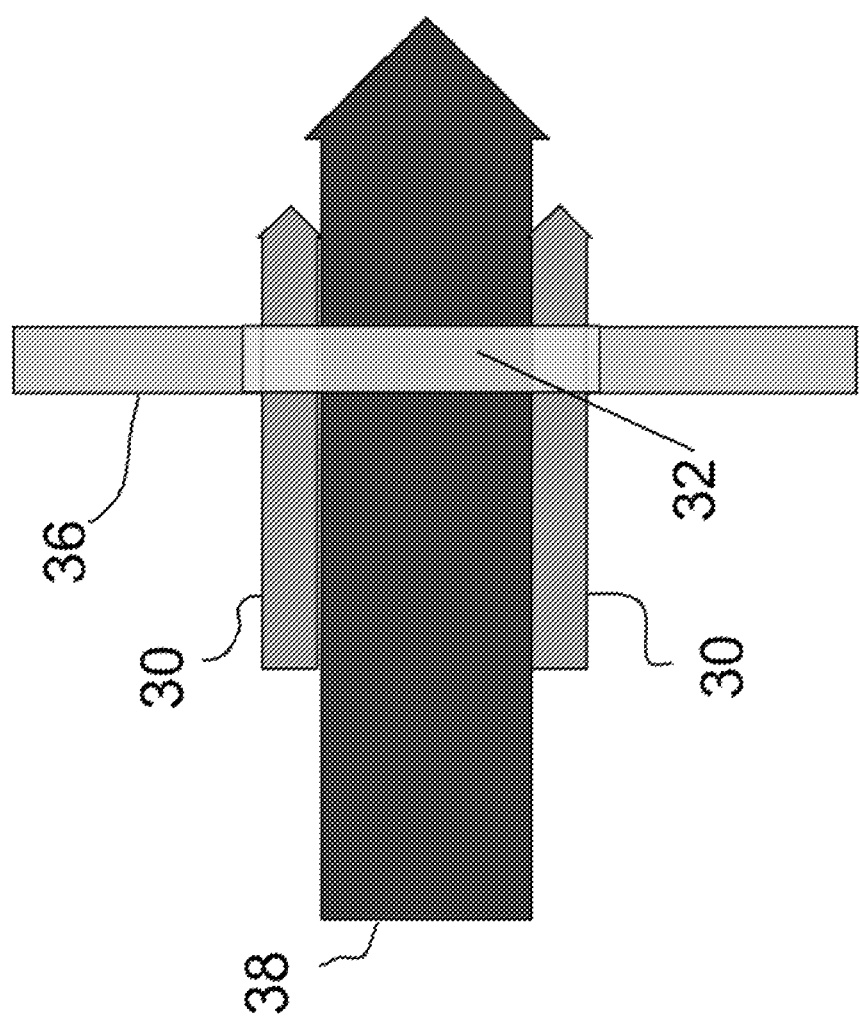
Figure 3:
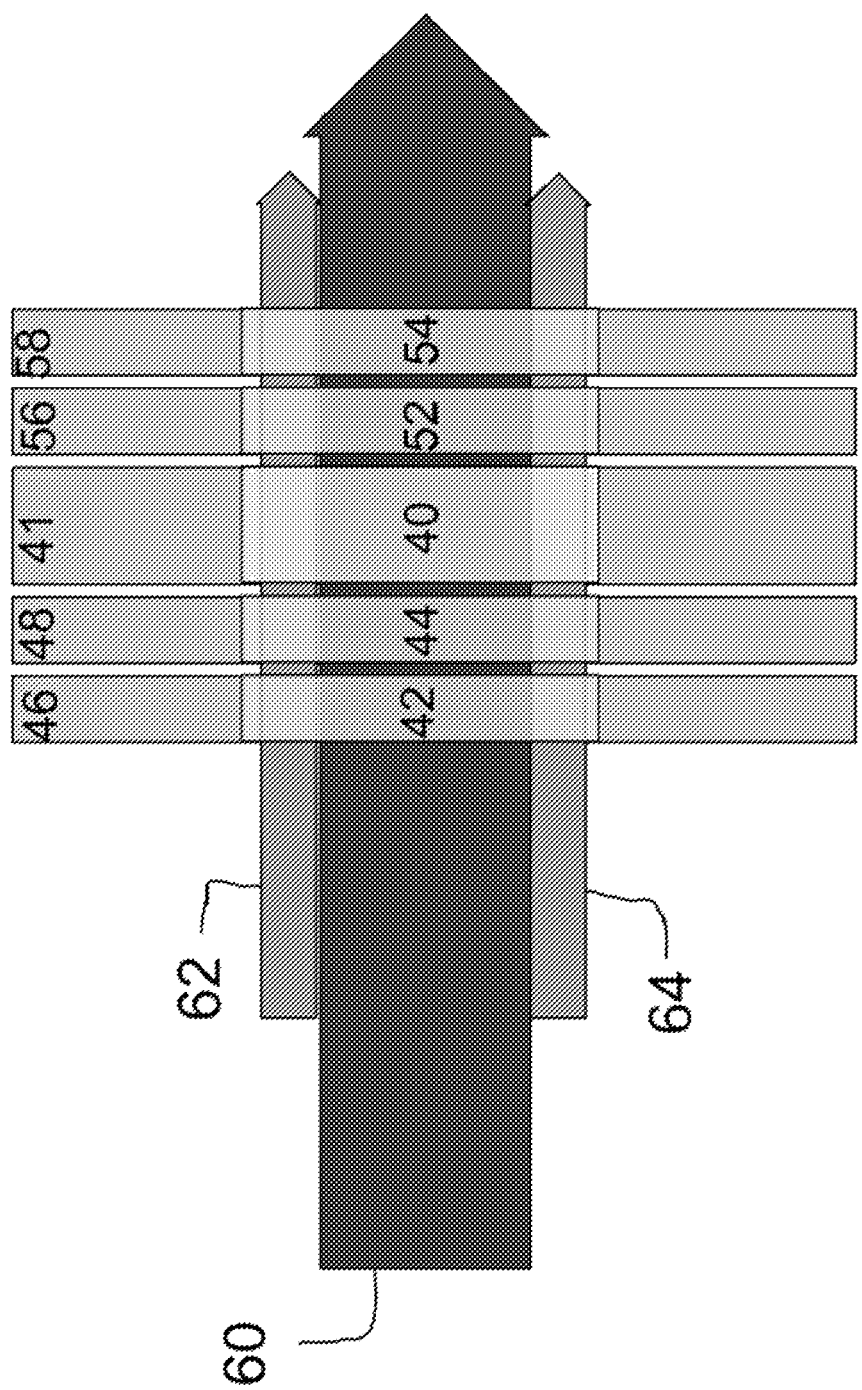
FIG. 3 shows a birefringence compensated design having a Quartz rotator optic between two sources of birefringence.
Figure 4:
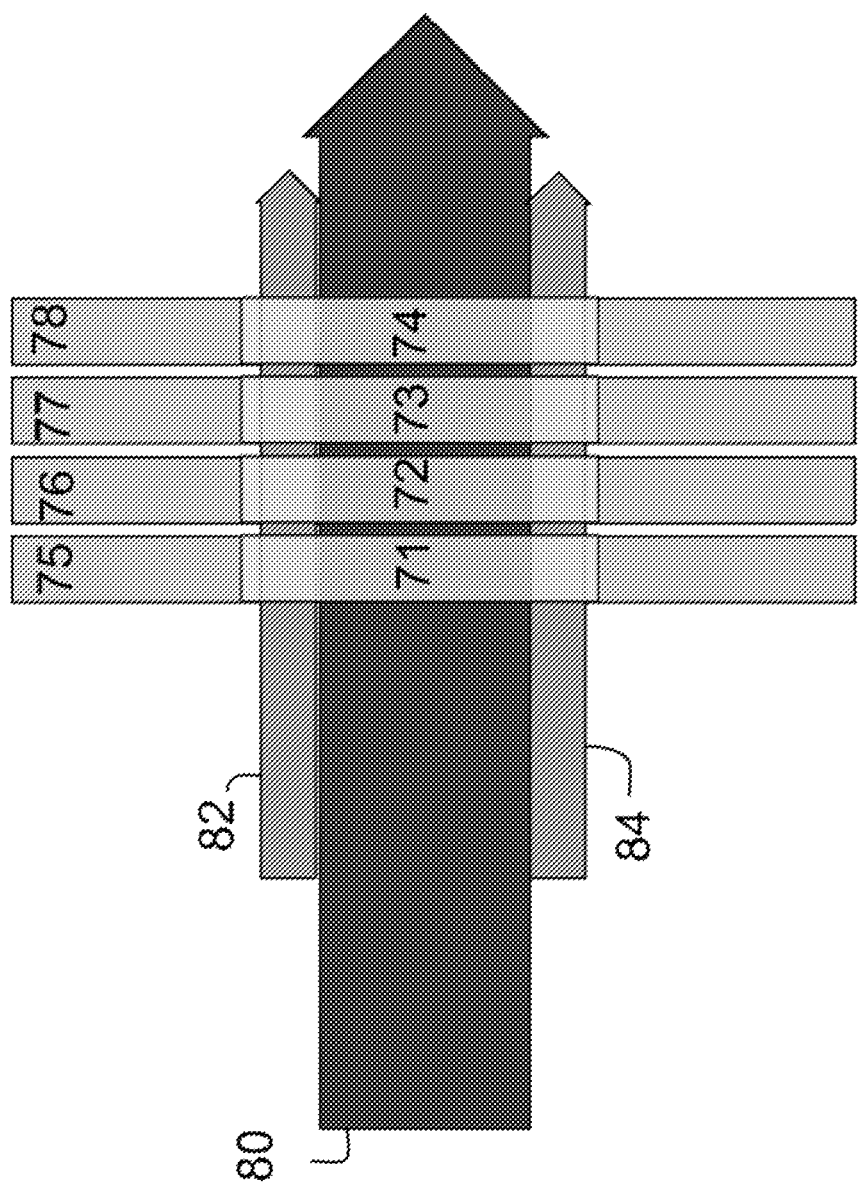
FIG. 4 shows a multiple slab embodiment using heater beams.

A second method of heating, illustrated in FIG. 2, is to project heater beams 30 onto the periphery of each slab (Faraday optic) 32. This can be accomplished locally with IR emitters or remotely by imaging optical beams generated by diodes or another laser source. The figure also shows a cooling vane 36 and laser beam 38. These techniques can be combined with the current technique of a birefringence compensated design. Such combination adds complication but would extend average power capability even further. Using this methodology, the Faraday technology can be scaled from the current scale ~<1 kW to 100 kW and potentially extend to >1 MW class laser systems. This scaling will enable these lasers to function at this level and thereby enable accelerator, secondary radiation source, and defense applications. This technology combines current Faraday techniques with advanced amplifier cooling methods as well as a methodology for managing the stress birefringence as the thermal loading increases beyond current conventional levels <kW. FIG. 3 shows a birefringence compensated design having a Quartz rotator optic 40 between two sources of birefringence. Rotator optic 40 is cooled with cooling vane 41. The requirement is that the two sources be well matched/symmetric about the quartz rotator. One source comprises two Faraday optic slabs 42 and 44, including respective cooling vanes 46 and 48. The other source comprises two Faraday optic slabs 52 and 54, including respective cooling vanes 56 and 58. The figure also shows laser beam 60 and the heater beams 62 and 64. FIG. 4 shows a design similar to FIG. 2, but including multiple slabs. The figure shows Faraday optic slabs 71-74, with respective cooling vanes 75-78. the figure also shows laser beam 80 and heater beams 82 and 84. Another option would be absorbing glass mounted as a frame around the optic. Light could then be directed at the glass for purposes of heating—so this method is optically addressed and could add spatial sculpting to achieve better uniformity performance.

Broadly, this writing discloses at least the following.

To enable several orders of magnitude increases in average power and energy handling capability of Faraday rotators, the technology utilizes high speed gas cooling to efficiently remove thermal loading from the Faraday optic faces while minimizing the thermal wavefront and thermal birefringence by creating a longitudinal thermal gradient. A recirculating gas cooling manifold accelerates the gas over the surface of the slab to create a turbulent flow condition which maximizes the surface cooling rate. The technology further provides a spatially uniform thermal profile on the Faraday slabs.

This writing also presents at least the following Concepts.
Concepts:

1. An apparatus, comprising:
    at least one Faraday optic having opposing optical faces through which there is a beam propagation axis that is orthogonal to said opposing optical faces;
    means for heating a portion of said at least one Faraday optic;
    a gas cooling system configured to provide gas to cool each face of said opposing faces; and
    a magnetic field source configured to induce a desired Faraday rotation of a laser beam propagating on said beam propagation axis through said at least one Faraday optic.

2. The apparatus of concepts 1 and 3-10, wherein as said laser beam propagates on said beam propagation axis and through said at least one Faraday optic, said gas cooling system together with said means for heating at least a portion of said at least one Faraday optic are configured to provide a spatially uniform thermal profile in said at least one Faraday optic.

3. The apparatus of concepts 1, 2 and 4-10, wherein said gas cooling system comprises a recirculating gas cooling manifold configured to accelerate said gas over the surface of said each face to create a turbulent flow condition.

4. The apparatus of concepts 1-3 and 5-10, wherein said gas comprises helium.

5. The apparatus of concepts 1-4, wherein said at least one Faraday optic comprises an outer edge, wherein said means for heating at least a portion of said at least one Faraday optic comprises a heater in contact with said outer edge.

6. The apparatus of concepts 1-4, wherein said at least one Faraday optic comprises an outer edge, wherein said means for heating at least a portion of said at least one Faraday optic comprises means for directing a heater beam onto said outer edge.

7. The apparatus of concepts 1-4, wherein said at least one Faraday optic comprises an outer edge, wherein said means for heating at least a portion of said at least one Faraday optic comprises means for directing a heater beam to an area between said beam propagation axis and said outer edge, closer to said outer edge than to said axis.

8. The apparatus of concept 5, further comprising an insulating material in contact with the side of each said heater that is not in contact with said Faraday material.

9. The apparatus of concept 8, wherein said source for an external magnetic field comprises a magnetic array within a housing, wherein a side of said insulating material that is not in contact with said heater is in contact with said housing.

10. The apparatus of concept 1-9, further comprising a Quartz rotator optic located between two Faraday optics of said at least one Faraday optic.

11. A method, comprising:
    directing a laser beam on a beam propagation axis through at least one Faraday optic, herein said at least one Faraday optic has opposing optical faces, wherein said beam propagation axis passes through said opposing faces and said Faraday optic and is orthogonal to said opposing optical faces;
    heating a portion of said at least one Faraday optic;
    gas cooling said opposing faces; and
    applying a magnetic field induce a desired Faraday rotation of a laser beam propagating on said beam propagation axis through said at least one Faraday optic.

12. The method of concept 11 and 13-17, wherein as said laser beam propagates on said beam propagation axis and through said at least one Faraday optic, said gas cooling system together with said means for heating at least a portion of said at least one Faraday optic provide a spatially uniform thermal profile in said at least one Faraday optic.

13. The method of concepts 11, 12 and 14-17, further comprising recirculating said gas over the surfaces of said opposing faces to create a turbulent flow condition.

14. The method of concepts 11-13 and 15-17, wherein said gas comprises helium.

15. The method of concepts 11-14, wherein the step of heating a portion of said at least one Faraday optic comprises heating an outer edge of said at least one Faraday optic.

16. The method of concepts 11-14, wherein the step of heating a portion of said at least one Faraday optic comprises directing a heater beam onto an outer edge of said at least one Faraday optic.

17. The method of concepts 11-14, wherein the step of heating a portion of said at least one Faraday optic comprises directing a heater beam to an area between said beam propagation axis and said outer edge, closer to said outer edge than to said axis.

All elements, parts and steps described herein are preferably included. It is to be understood that any of these elements, parts and steps may be replaced by other elements, parts and steps or deleted altogether as will be obvious to those skilled in the art.

The foregoing description has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
   at least one Faraday optic having opposing optical faces through which there is a beam propagation axis that is orthogonal to said opposing optical faces;
   means for heating a portion of said at least one Faraday optic;
   a gas cooling system configured to provide gas to cool each face of said opposing faces; and
   a magnetic field source configured to induce a desired Faraday rotation of a laser beam propagating on said beam propagation axis through said at least one Faraday optic.

2. The apparatus of claim 1, wherein as said laser beam propagates on said beam propagation axis and through said at least one Faraday optic, said gas cooling system together with said means for heating at least a portion of said at least one Faraday optic are configured to provide a spatially uniform thermal profile in said at least one Faraday optic.

3. The apparatus of claim 1, wherein said gas cooling system comprises a recirculating gas cooling manifold configured to accelerate said gas over the surface of each said face to create a turbulent flow condition.

4. The apparatus of claim 1, wherein said gas comprises helium.

5. The apparatus of claim 1, wherein said at least one Faraday optic comprises an outer edge, wherein said means for heating at least a portion of said at least one Faraday optic comprises a heater in contact with said outer edge.

6. The apparatus of claim 1, wherein said at least one Faraday optic comprises an outer edge, wherein said means for heating at least a portion of said at least one Faraday optic comprises means for directing a heater beam onto said outer edge.

7. The apparatus of claim 1, wherein said at least one Faraday optic comprises an outer edge, wherein said means for heating at least a portion of said at least one Faraday optic comprises means for directing a heater beam to an area between said beam propagation axis and said outer edge, closer to said outer edge than to said axis.

8. The apparatus of claim 1, comprising at least two of said Faraday optics.

9. The apparatus of claim 1, wherein said gas cooling system is configured to direct said gas to outer surfaces of said opposing optical faces.

10. The apparatus of claim 1, further comprising a Quartz rotator optic located between two Faraday optics of said at least one Faraday optic.

11. A method, comprising:
    directing a laser beam on a beam propagation axis through at least one Faraday optic, herein said at least one Faraday optic has opposing optical faces, wherein said beam propagation axis passes through said opposing faces and said Faraday optic and is orthogonal to said opposing optical faces;
    heating a portion of said at least one Faraday optic;
    gas cooling said opposing faces; and
    applying a magnetic field induce a desired Faraday rotation of a laser beam propagating on said beam propagation axis through said at least one Faraday optic.

12. The method of claim 11, wherein as said laser beam propagates on said beam propagation axis and through said at least one Faraday optic, said gas cooling together with said heating a portion of said at least one Faraday optic provide a spatially uniform thermal profile in said at least one Faraday optic.

13. The method of claim 11, further comprising recirculating said gas over the surfaces of said opposing optical faces to create a turbulent flow condition.

14. The method of claim 11, wherein said gas comprises helium.

15. The method of claim 11, wherein the step of heating a portion of said at least one Faraday optic comprises heating an outer edge of said at least one Faraday optic.

16. The method of claim 11, wherein the step of heating a portion of said at least one Faraday optic comprises directing a heater beam onto an outer edge of said at least one Faraday optic.

17. The method of claim 11, wherein the step of heating a portion of said at least one Faraday optic comprises directing a heater beam to an area between said beam propagation axis and an outer edge of said at least one Faraday optic, closer to said outer edge than to said axis.

18. An apparatus, comprising:
    at least one Faraday optic having opposing optical faces through which there is a beam propagation axis that is orthogonal to said opposing optical faces;
    a mechanism for heating a portion of said at least one Faraday optic;
    a gas cooling system configured to provide gas to cool each of said opposing faces; and
    a magnetic field source configured to induce a desired Faraday rotation of a laser beam propagating along said beam propagation axis through said at least one Faraday optic.

19. The apparatus of claim 18, wherein said gas cooling system is configured to accelerate said gas over the surface of each said face to create a turbulent flow condition.

20. The apparatus of claim 18, wherein each Faraday optic is a solid slab extending between the opposing faces thereof.

* * * * *